(12) United States Patent
Benyak

(10) Patent No.: US 6,533,173 B2
(45) Date of Patent: Mar. 18, 2003

(54) PRODUCT LOCATOR AND PRICE CHECKING SYSTEM

(76) Inventor: Donald A. Benyak, 118 Chestnut Ave., Northfield, OH (US) 44067

( * ) Notice: Subject to any disclaimer, the term of this patent is extended or adjusted under 35 U.S.C. 154(b) by 49 days.

(21) Appl. No.: 09/751,988

(22) Filed: Dec. 29, 2000

(65) Prior Publication Data

US 2002/0084323 A1 Jul. 4, 2002

(51) Int. Cl.[7] .............................................. G06K 15/00
(52) U.S. Cl. .................... 235/383; 235/378; 235/385; 705/20; 705/23; 705/24
(58) Field of Search ............................ 235/383, 380, 235/462.43, 462.45, 462.46, 375, 385, 472.01, 378; 705/20, 23, 24

(56) References Cited

U.S. PATENT DOCUMENTS

| | | | | | |
|---|---|---|---|---|---|
| 4,071,740 A | * | 1/1978 | Gogulski | ...................... | 186/61 |
| 5,158,310 A | * | 10/1992 | Tannehill et al. | ............. | 186/62 |
| 5,250,789 A | * | 10/1993 | Johnsen | ...................... | 235/383 |
| 5,424,524 A | * | 6/1995 | Ruppert et al. | ............. | 235/383 |
| 5,734,839 A | * | 3/1998 | Enoki et al. | ................... | 705/20 |
| 5,739,513 A | * | 4/1998 | Watanabe | ..................... | 186/61 |
| 5,773,954 A | * | 6/1998 | VanHorn | ............... | 280/33.991 |
| 5,821,512 A | * | 10/1998 | O'Hagan et al. | ........... | 235/383 |
| 5,821,513 A | * | 10/1998 | O'Hagan et al. | ........... | 235/383 |
| 5,841,115 A | * | 11/1998 | Shepley | ...................... | 235/375 |
| 5,884,281 A | * | 3/1999 | Smith et al. | .................. | 705/26 |
| 6,092,725 A | * | 7/2000 | Swartz et al. | ............... | 235/380 |
| 6,189,788 B1 | * | 2/2001 | Sherman et al. | ............ | 235/383 |

\* cited by examiner

Primary Examiner—Thien M. Le
Assistant Examiner—Uyen-Chau N. Le
(74) Attorney, Agent, or Firm—Forrest L. Collins

(57) ABSTRACT

A product locator system to permit a user of a first computer to received data stored in a second computer. The data stored in the second computer relates to the location of products and in addition may provide information such as pricing, coupons, special offers and other information the consumer utilizing the first computer. The data transmitted from second computer to first computer is obtainable by the consumer for use in locating various products and product pricing.

19 Claims, 2 Drawing Sheets

PRODUCT LOCATOR AND PRICE CHECKING SYSTEM

BACKGROUND OF THE INVENTION

1. Field of the Invention

The purpose of this invention is to aid a consumer in locating items within a store 2. Description of the Art Practices U.S. Pat. No. 5,883,375 issued to Knowles, et al., Mar. 16, 1999 discloses a fully automatic bar code symbol reading system having an hand-supportable laser bar code reading device which can be used in either an automatic hands-on mode of operation, or in an automatic hands-free mode of operation. The system includes a scanner support frame for supporting the hand-supportable device in a user-selected mounting position, and permits complete gripping of its handle portion prior to its use in the hands-on mode of operation. In general, the hand-supportable bar code reading device has long-range and short-range modes of object detection, bar code presence detection and bar code symbol reading. In the illustrative embodiment, the long-range mode is automatically selected when the hand-supportable bar code reading device is placed within the scanner support stand during the automatic hands-free mode of operation. Whenever the hand-supportable bar code reading device is picked up from the support stand and used in its hands-on mode of operation, the short-range mode is automatically selected to provide CCD-like scanner emulation. When used in either mode of operation, the automatic bar code reading device is capable of reading, in a consecutive manner, one or more bar code symbols on an object, while preventing multiple reading of the same bar code symbol due to dwelling of the laser scanning beam upon the bar code symbol. The automatic bar code symbol reading system of the present invention is disclosed in several different mounting arrangements at a point-of-sale station, illustrating novel methods of reading bar code symbols using the automatic hand-supportable laser scanning device of the present invention.

U.S. Pat. No. 6,119,935 issued to Jelen, et al., Sep. 19, 2000 describes a system for acquiring shopping list information includes a user terminal and a base unit in selective data communication via a wide-area network, such as the global Internet, common data carrier or a modulated wave propagating over a public utility. The user terminal includes a bar code scanner for getting Uniform Product Code information from a product container or from a manufacturer's coupon. The user compiles, via the user terminal, a shopping list database by scanning previously obtained products, manufacturer's coupons, or using direct user input via an interface such as a keyboard or mouse. Once compiled, the database is selectively transmitted to a base unit situated at a retailer via the wide-area network.

U.S. Pat. No. 6,129,276 issued to Jelen, et al. Oct. 10, 2000 discloses a shopping cart mounted portable data collection device with tethered dataform reader. The system of Jelen et al., is designed to acquiring shopping list information and includes a user terminal and a base unit in selective data communication via a wide-area network, such as the global Internet, common data carrier or a modulated wave propagating over a public utility. The user terminal includes a bar code scanner for getting Uniform Product Code information from a product container or from a manufacturer's coupon. The user compiles, via the user terminal, a shopping list database by scanning previously obtained products, manufacturers coupons, or using direct user input via an interface such as a keyboard or mouse. Once compiled, the database is selectively transmitted to a base unit situated at a retailer via the wide-area network.

U.S. Pat. 6,073,112 issued to Geerlings on Jun. 6, 2000 discloses a computer system for merchant communication to customers. The system of Geerlings employs a computer system to provide automated merchant-to-customer communication. Each merchant customer is grouped into an initial grouping or entry segment, based on merchant definition of allocation filters. Merchant-defined triggers subsequently resegment customer groupings based on predefined criteria, which includes any measurable behavioral patterns as provided by the merchant and stored in a data base. Resegmenting is continually or dynamically provided based on behavior (e.g., shopping activity) of customers. Predefined communication scheduling and/or merchant-defined events initiate execution of a working communication designed by the merchant. The triggers and events are merchant-specified sets of criteria based on demographics, psychographics, and customer shopping behavior. Further filtering of a group of target customers to a final recipient group based on merchant specified criteria is provided by program filters. The present invention combination of allocators, triggers, filters, events and communication programs enable merchant communication of a desired message, to an appropriate recipient group, at a desired time, to be automated through computer systems.

Lloyd, Jr., et al. in U.S. Pat. No. 4,542,808 issued Sep. 24, 1985 describes an order filling apparatus includes an elongated belt conveyor having a bin-on switch and a bin-off switch at opposite ends thereof A plurality of item dispensers are positioned along the conveyor, and each dispenser is loaded with a single type of item. An order filling control computer has a bus cable extending along the conveyor, and each dispenser has a dispenser control board connected to the bus. Each control board includes an address decoder and circuitry for relaying command signals from the controller to the dispenser and for generating status signals indicating the operational status of the dispenser. A conveyor travel encoder provides a position signal indicative of conveyor travel. The controller stores orders to be filled with items. An order filling method includes a conveying item receptacle bins past the dispensers to receive items therefrom. As each bin engages the bin-on switch, an order is activated and associated with the bin. The controller is operative to track each bin on the conveyor, detect the presence of each bin at a dispenser loaded with items called for by the order associated therewith, control the dispenser to dispense a quantity of items required by the associated order, detect whether each attempt to dispense an item actually occurs, deactivate each order as the associated bin engages the bin-off switch, and effect the printing of a report listing any items which were called for but not dispensed.

In U.S. Pat. No. 6,131,067 issued to Girerd, et al. on Oct. 10, 2000 there is disclosed a user accesses a server using a client. The client provides an identification code which serves to uniquely identify a remote sensor. The remote sensor is capable of providing information related to its position. The server interrogates the remote sensor and, in response, the remote sensor transmits positioning data to the server where it is analyzed to derive the location of the remote server. The location so determined is transmitted from the server to the client and is displayed at the client so that the user can identify the location of the remote sensor. The client and the server may be connected to a computer network and the client may use a web browser to interrogate the server. The remote sensor may be a SNAPSHOT GPS receiver or other GPS receiver or positioning device. The user display may be a simple position report, e.g., latitude and longitude, or a graphical report which provides an indication of the remote sensor's location superimposed on a map or other reference.

To the extent that the foregoing references are relevant to the present invention, they are herein specifically incorporated by reference.

SUMMARY OF THE INVENTION

A first embodiment of the present invention is a product locator system comprising:

- a first computer containing programming responsive to the commands of a user of said first computer regarding the location of products within a store;
- a second computer containing programming and having stored data comprising information regarding the location of products within the store;
- said first computer having data receiving means to receive and store data comprising information regarding the location of products within the store from said second computer;
- said first computer having a display mechanism responsive to the commands of the user of the first computer wherein, for when in use, the user of said first computer inputs a request for the stored data comprising information regarding the location of products within the store as previously obtained by said first computer from said second computer regarding the location of products within the store; and,
- wherein the output of the location of products within the store as requested by the user first computer is displayed by the display mechanism of the first computer.

A second embodiment of the present invention is product locator system comprising:

- a first computer containing programming responsive to the commands of a user of said first computer regarding the location of products within a store;
- a second computer containing programming and having stored data comprising information regarding the location of products within the store;
- said first computer having data receiving means to receive and store data comprising information regarding the location of products within the store from said second computer;
- said first computer having a display mechanism responsive to the commands of the user of the first computer wherein, for when in use, the user of said first computer inputs a request for the stored data comprising information regarding the location of products within the store as previously obtained by said first computer from said second computer regarding the location of products within the store;
- wherein the output of the location of products within the store as requested by the user first computer is displayed by the display mechanism of the first computer;
- said first computer containing programming to request the location of a specific product or specific pricing of products from data received and stored in said first computer from said second computer;
- said first computer contains programming for communication of data from said second computer to provide information relating to special pricing or offers of selected products to said first computer;
- said first computer further comprising a Universal Product Code scanning system, for when in use by a user of the first computer, to provide data regarding products within the store where such data has been previously obtained from said second computer and stored in said first computer; and,
- said first computer further comprising a standardized product list independent of data received from said second computer.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

With more particular reference to the drawings the following is set forth.

DETAILED DESCRIPTION OF THE INVENTION

The present invention deals with locating products in stores. All consumers have undoubtedly felt confused when stores relocated merchandise or when in shopping at a new store. The absence of a sufficient staffing, a relatively untrained staff, or insufficient staffing which is untrained further complicates shopping.

As frustration of shopping increases for the consumer is not unheard consequence of consumer to simply leave the store without purchasing the items desired. Not only is the customer frustrated, but the store also loses a sale.

Figure 1:
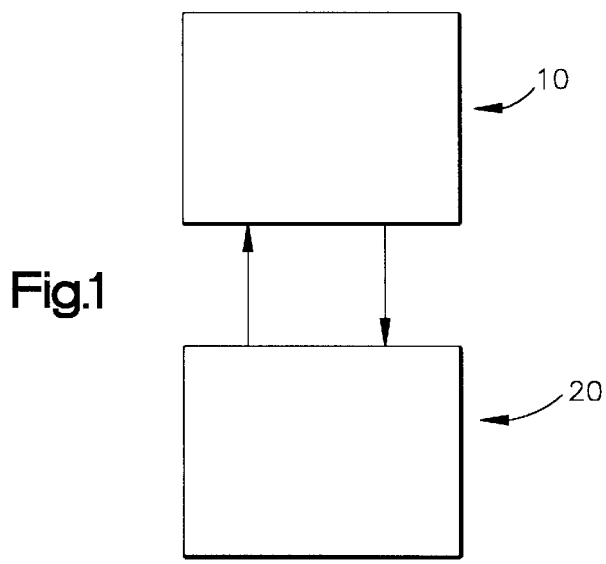
FIG. 1 is a schematic drawing of the present invention.

As best seen in FIG. 1, is a schematic of the operation present invention. A personal shopping device 10 is effectively a personal computer and may be a conventional laptop or palm held computer. Software (not shown) is installed in the personal shopping device 10. Software in the personal shopping device 10 facilitates communication with a second computer 20. The second computer 20 also has software generally of a more complicated version of first software installed in the personal shopping device 10.

The second computer 20 may be located in a store or may be a centrally located computer in a totally remote location from that which the shopping normally occurs. Simply stated, in a first scenario envisioned, the personal shopping device 10 is taken to the store in which the second computer 20 is installed. The personal shopping device 10 is then topped with the second computer 20. An exchange of information (data) takes place with data stored in the second computer 20 being inputted into personal shopping device 10. The direction of the arrows and FIG. 1 shows the flow of data between the personal shopping device 10 and the second computer 20.

Alternatively, the personal shopping device 10 may be loaded with data via an Internet connection. In the second scenario, the second computer 20 to may be located at the store that which the shopping is to be accomplished or may be located at a central location. The central location, the location of the second computer 20, is feasible where a number of similar stores are located across the country and have a common design and common product placement.

In a first version of the present invention, the personal shopping device 10 is provided by the store that which the shopping is to be accomplished. In a second version of the present invention and personal shopping device 10 is owned or leased by the individual consumer. In the scenario where the personal shopping device 10 is owned or leased by the consumer the software will permit comparison shopping between various stores in the user's location.

Figures 2, 3:
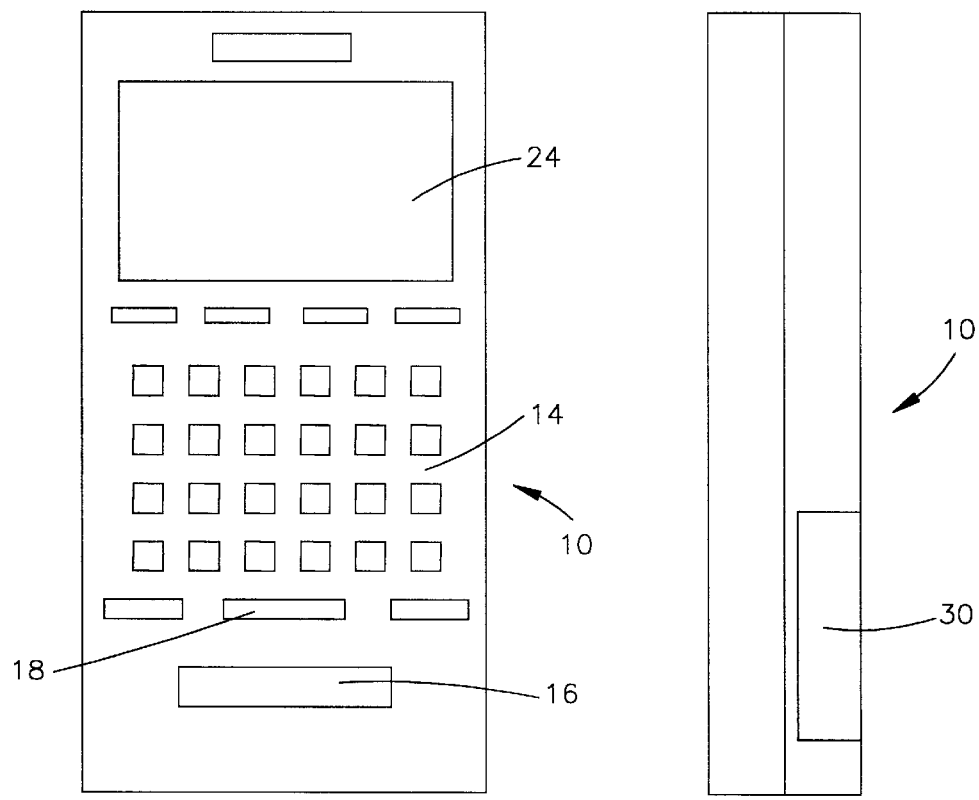
FIG. 2 is a view of a data terminal.
FIG. 3 is a side view of a data terminal according to FIG. 2.

As best seen in FIG. 2 is a home held version of personal shopping device 10. The personal shopping device 10 has a keypad 14 for input of requested information from data which is downloaded from the second computer 20. Also seen in FIG. 2, is a microphone 16 with associated amplifier 18 to permit voice activation of the personal shopping device 10. The microphone 16 with associated amplifier 18 allows an alternative method of data input, such as for a person with limited visual acuity.

The personal shopping device 10 also has a display screen 24. The display screen 24 permits of requested information (requested by the user) to be displayed. The display screen, or for that matter the associated amplifier 18, also permits information concerning the product to be obtained. Thus, for example, in a grocery store information concerning related products may be visually displayed or audibly played to the consumer (personal shopping device user). As shown in FIG. 3 the personal shopping device 10 may be powered by a battery 30. The battery 30 should be sufficiently long life to permit the consumer to shop for several items in a number of stores over the course of a day. Therefore it is recommended that metal hydride batteries be employed.

Figure 4:
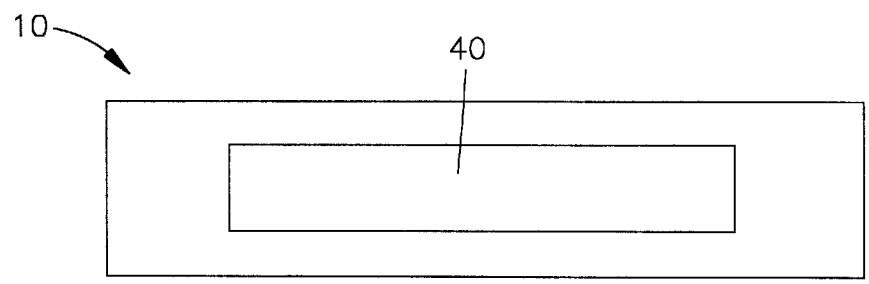
FIG. 4 is a top end view of the data terminal according to FIG. 2.

As best seen in FIG. 4 is a top view of the personal shopping device 10. A scanning tool 40 is built into the personal shopping device 10. The scanning tool 40 may be of the infrared or laser variety. As the technology for scanning tools 40 is relatively sophisticated, no further discussion of the scanning tool 40 is given of particular type employed in the present invention.

The scanning tool 40 permits the user of personal shopping device 10 to obtain information on the pricing of a product located in the store in which the personal shopping device 10 is utilized. As the technology is a place, it is possible to utilize the scanning tool 40 to obtain information on a product located in the consumer's home or other location and price the same based on data supplied by the second computer 20.

The information obtained from the scanning tool 40 is visually display for all the display on the display screen 24. In this manner, the consumer will know in the store what the pricing on item is rather than having to determine the price at checkout. Secondly, comparison shopping is intimately possible utilizing scanning tool 40.

Figure 5:
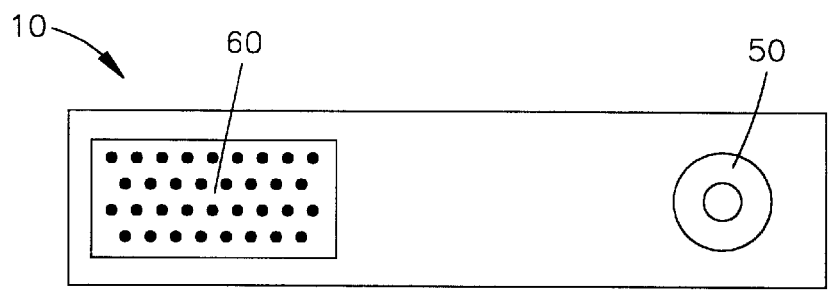
FIG. 5 is lower end view of the data terminal according to FIG. 2.

As best seen in FIG. 5 is a lower end view of personal scanning device 10. A direct current (DC) power supply adapter receptacle is available. The power supply adapter receptacle 50 receives power from the power supply adapter (not shown). In this matter, the personal shopping device 10 may be recharged while shopping by utilizing a converter plug in combination with an automobile cigarette lighter (vehicle DC power supply).

Also has seen in FIG. 5, is a recessed set of male computer pins 60 in the personal shopping device 10. The recessed male computer pins 60 permit connection to the second computer 20 in a store. It is believed that by utilizing the recessed male computer pins that there will likely be less damage likely to occur to the terminal (not shown) of the second computer 20 in the store. Of course, more than one terminal may be employed in the store to facilitate customers obtaining data for the personal shopping device 10 from second computer 20.

Figure 6:
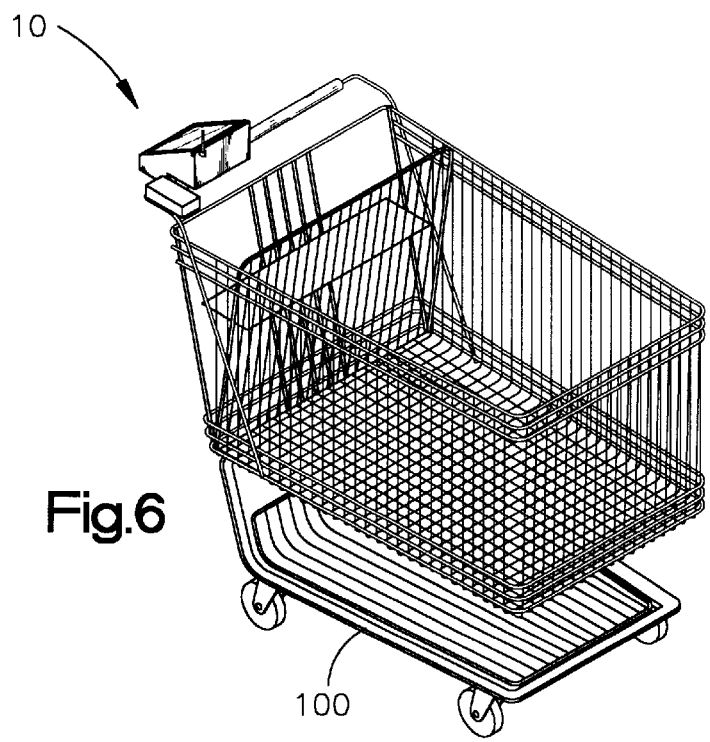
FIG. 6 is a perspective of a shopping cart associated with a data terminal.

As best seen in FIG. 6 is the personal shopping device 10 secured to a grocery cart 100. In this manner, the personal shopping device 10 may be placed in the store, owned, and maintained in the store without particular concern to loss prevention matters.

In use, the personal shopping device 10 is connected with a second computer 20 in a variety store. The product selection within the variety store may be automatically displayed for the consumer utilizing the personal shopping device 10. Automatically, the consumer programs and personal shopping device to request location specific items within the variety store, the specific items will be displayed as location on the display screen 24 or audibly given to the consumer.

The information inputted by the consumer in the personal shopping device 10 will with regard to be variety store permit the location {items to be mapped out and displayed via the personal shopping device 10). Also large variety store, or a grocery store, each item selected by the consumer by input into personal shopping device 10 will be located as to aisle, side of the aisle, and shelf location (e.g. X-axis, Y-axis, and Z-axis).

The consumer may request a specific brand name of an item and store. The data input by the second computer 20 into the personal shopping device 10 may then provide information concerning alternative products such as a store brand and pricing alternative products.

The scanning tool 40 feature of personal shopping device 10 may be utilized to obtain information from the Universal Product Code labels on most nearly every product. Again, alternative pricing and what location of alternative goods may be obtained. The consumer may also map out a route not only within a specific store but by obtaining information from the second computer of several stores may determine where product may be purchased. Thus, travel time may be minimized thereby leading to less frustration and more time available for other activities by the consumer utilizing the personal scanning device 10.

A further convenience of personal shopping device 10 is permit the rapid checkout of products with whom located the cashier. Thus the personal shopping device 10 may utilize the scanning tool 40 to obtain and store price information on products placed in, for example, a grocery cart. The personal shopping device 10 may be then be adopted a second time with the second computer 20. The pricing of the goods selected may then with a simple keystroke be charged to a credit or debit card permitting the consumer-user of personal shopping device 10 to avoid long lines in a store.

Yet a further advantage to the personal shopping device 10 of the present invention is to information regarding likely purchases. Thus, a consumer may input a grocery list, or such may be inputted view the original programming, into the personal shopping device 10. In the foregoing manner an automated grocery list is obtained within the memory personal shopping device 10.

From the above description of the invention, those skilled in the art will perceive improvements, changes and modifications. Such improvements, changes and modifications within the skill of the art are intended to be covered by the appended claims.

What is claimed is:

1. A product locator system comprising:
a first computer containing programming responsive to the commands of a user of said first computer regarding the location of products within a store wherein the store has one or more aisles equipped with shelving having one or more shelves;
a second computer containing programming and having stored data comprising information regarding the location of products within the store by aisle, side of the aisle, and shelf location;
said first computer having data receiving means to receive and store data comprising information regarding the location of products within the store from said second computer;
said first computer having a display mechanism responsive to the commands of the user of the first computer wherein, for when in use, the user of said first computer inputs a request for the stored data comprising information regarding the location of products the store as previously obtained by said first computer from said second computer regarding the location of products within the store; and,
wherein the output of the location of products within the store as requested by the user first computer is displayed by aisle, side of the aisle, and shelf location within the display mechanism of the first computer by aisle, side of the aisle, and shelf location.

2. The product locator system according to claim 1, wherein said first computer contains programming to request the location of a specific product from data received and stored in said first computer from said second computer.

3. The product locator system according to claim 1, wherein said second computer contains data relating to pricing of products available in the store and such data is transmitted to said first computer.

4. The product locator system according to claim 1, wherein said first computer contains programming to request the price of a specific product from data received and stored in said first computer from said second computer.

5. The product locator system according to claim 1, wherein said first computer contains programming for communication of data from said second computer to provide information relating to special pricing or offers of selected products to said first computer.

6. The product locator system according to claim 1, wherein said first computer further comprises a Universal Product Code scanning system, for when in use by a user of the first computer, to provide data regarding products within the store where such data has been previously obtained from said second computer and stored in said first computer.

7. The product locator system according to claim 1, wherein said first computer has Universal Product Code scanning capability, and the Universal Product Code scanning information when entered into said first computer, is read by said second computer to check out purchases by the user of the first computer.

8. The product locator system according to claim 1, wherein said first computer further comprises a standardized product list independent of data received from said second computer.

9. The product locator system according to claim 1, wherein said first computer, when in use, is responsive to vocal communication of requests for data.

10. The product locator system according to claim 1, wherein said first computer has a male docking station and said second computer has a female docking station, for when in use, to permit docking out the first computer with the second computer to receive data relating to the location of products within the store.

11. The product locator system according to claim 1, which is attached to a shopping cart.

12. The product locator system according to claim 1, wherein said display mechanism is a display screen.

13. The product locator system according to claim 1, wherein said display mechanism is an audible system.

14. A product locator system comprising:
a first computer containing programming responsive to the commands of a user of said first computer regarding the location of products within at least two stores;
at least two second computers containing programming and having stored data comprising information regarding the location of products within at least two stores;
said first computer having data receiving means to receive and store data comprising information regarding the location of products within the at least two stores from the said at least two second computers;
said first computer having a display mechanism responsive to the commands of the user of the first computer wherein, for when in use, the user of said first computer inputs a request for the stored data comprising information regarding the location of products within at least one of the at least two stores as previously obtained by said first computer from at least one of said at least two second computers;
wherein the output of the location of products within the at least one of the at least two stores as requested by the user first computer is displayed by the display mechanism of the first computer;
said first computer containing programming to request the location of a specific product or specific pricing of products from data received and stored in said first computer from at least one of second computers;
said first computer containing programming for communication of data from at least one of second computers to provide information relating to special pricing or offers of selected products to said first computer;
said first computer further comprising a Universal Product Code scanning system, for when in use by a user of the first computer, to provide data regarding products within the store where such data has been previously obtained from at least one of second computers and stored in said first computer; and,
said first computer further comprising a standardized product list independent of data received from at least one of second computers.

15. The product locator system according to claim 14, wherein said first computer further comprises a standardized product list independent of data received from said second computer.

16. The product locator system according to claim 14, which is attached to a shopping cart.

17. The product locator system according to claim 14, wherein said display mechanism is a display screen.

18. The product locator system according to claim 14, wherein said display mechanism is an audible system.

19. The product locator system according to claim 14, wherein said Universal Product Code scanning information when entered into said first computer, is read by said second computer to check out purchases by the user of the first computer.

* * * * *